United States Patent [19]
Le Peltier et al.

[11] Patent Number: 6,153,090
[45] Date of Patent: *Nov. 28, 2000

[54] CATALYTIC HYDROREFORMING PROCESS

[75] Inventors: Fabienne Le Peltier; Blaise Didillon, both of Rueil Malmaison; Olivier Clause, Chatou, all of France

[73] Assignee: Institut Francais du Petrole, Rueil Malmaison Cedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 09/182,657

[22] Filed: Oct. 30, 1998

[30] Foreign Application Priority Data

Oct. 31, 1997 [FR] France ................................. 97/13.686

[51] Int. Cl.$^7$ .......................... C10G 35/09; C10G 35/06
[52] U.S. Cl. ........................ 208/137; 208/138; 585/418; 585/419
[58] Field of Search .................................. 208/137, 138; 585/418, 419

[56] References Cited

U.S. PATENT DOCUMENTS

| | | | |
|---|---|---|---|
| 3,669,875 | 6/1972 | Plank et al. | 208/65 |
| 3,830,726 | 8/1974 | Weisang et al. | 208/138 |
| 3,929,683 | 12/1975 | Antos | 208/138 |
| 3,992,468 | 11/1976 | Cosyns et al. | 585/489 |
| 4,507,401 | 3/1985 | Dubois et al. | 502/242 |
| 4,513,098 | 4/1985 | Tsao | 502/216 |
| 4,548,918 | 10/1985 | Bournonville et al. | 502/154 |
| 4,737,262 | 4/1988 | Franck et al. | 208/65 |
| 5,456,822 | 10/1995 | Marcilly et al. | 208/136 |

*Primary Examiner*—Walter D. Griffin
*Attorney, Agent, or Firm*—Millen, White, Zelano & Branigan, P.C.

[57] ABSTRACT

A process for catalytic reforming and for producing aromatics is carried out in the presence of a catalyst comprising at least one support, at least one metal from group VIII of the periodic table and at least one additional element M selected from the group formed by germanium, tin, lead, rhenium, gallium, indium, and thallium. The process is characterized in that the catalyst is prepared using a process in which said metal M is introduced in an aqueous solvent in the form of at least one organometallic compound comprising at least one carbon-M bond.

26 Claims, No Drawings

CATALYTIC HYDROREFORMING PROCESS

FIELD OF THE INVENTION

The present invention relates to a novel process for catalytic hydroreforming and for producing aromatics in the presence of a catalyst comprising at least one support, at least one metal from group VIII of the periodic table and at least one additional element M selected from the group formed by germanium, tin, lead, rhenium, gallium, indium and thallium. The catalyst can also contain a further element and/or a metalloid such as sulphur and/or any other chemical element such as a halogen or a halogen-containing compound.

BACKGROUND OF THE INVENTION

Catalyst formulations used in hydrocarbon conversion processes have been the subject of a very large number of studies. Patents and publications demonstrating that the addition of promoters to a base metal improves the quality of catalysts exist in large numbers.

For catalytic reforming catalysts, acid catalysts comprising, in addition to a support, a noble metal from the platinum family and at least one additional metal M (French patent FR-A-2 495 605) have been known for a long period. Such catalysts are bifunctional as they combine two functions which are essential for producing the proper performance: a hydro-dehydrogenating function which dehydrogenates naphthenes and hydrogenates coke precursors, and an acid function which isomerises naphthenes and paraffins, and cyclises long paraffins. Platinum has a hydrogenolysing activity which deleteriously affects the yields of the desired gasolines and/or aromatics in the catalytic reforming or the aromatic production process. That hydrogenolysing activity can be substantially reduced, and thus the selectivity of the catalyst can be increased, by adding an additional metal M. Further, adding element M can also increase the hydrogenating properties of the platinum, encouraging hydrogenation of the coke precursors and thus increasing the stability of the catalyst.

Such elements are added in different forms such as mineral salts or organometallic compounds. The manner in which such modifying agents are introduced is not unimportant as it dictates the properties of the catalyst to a great extent. Thus a metal M is advantageously introduced using an organometallic compound of that metal M. Such a technique for introducing a metal M has been described in the Applicant's U.S. Pat. No. 4,548,918. Metal M is introduced in the form of at least one organometallic compound selected from the group formed by complexes, in particular carbonyl or polyketone complexes of metals M, and metal hydrocarbyls of metal M such as alkyls, cycloalkyls, aryls, metal alkylaryls and metal arylalkyls.

Introducing the additional element M in the form of an organometallic compound leads to more effective catalysts but necessitates the use of an organic solvent. The impregnating solvent described in U.S. Pat. No. 4,548,918 is selected from the group formed by oxygen-containing organic solvents containing 2 to 8 carbon atoms per molecule, paraffin, naphthene or aromatic hydrocarbons essentially containing 6 to 15 carbon atoms per molecule, and halogen-containing oxygen-containing organic compounds containing 1 to 15 carbon atoms per molecule. Such solvents can be used alone or mixed together.

SUMMARY OF THE INVENTION

In the present invention we have discovered that particularly effective catalysts can be prepared by introducing metal M in the form of an organometallic complex which is soluble in an aqueous solvent. This represents a considerable advance as regards ease of use during production of the catalyst. Using industrial quantities of organic solvents has many disadvantages as regards safety (flammability, toxicity) and as regards costs.

The support for the catalyst of the invention comprises at least one refractory oxide which is generally selected from oxides of metals from groups IIA, IIIA, IIIB, IVA or IVB of the periodic table such as oxides of magnesium, aluminium, silicon, titanium, zirconium or thorium, used alone or mixed together or mixed with oxides of other elements from the periodic table. Charcoal can also be used. X, Y, mordenite, faujasite, ZSM-5, ZSM-4 or ZSM-8 type zeolites or molecular sieves can also be used, as well as mixtures of oxides of group IIA, IIIA, IIIB, IVA or IVB metals with a zeolitic material.

Alumina constitutes the preferred support, the specific surface area of which is advantageously in the range 5 to 400 $m^2$ per gram, preferably in the range 50 to 350 $m^2$ per gram.

In addition to a support, the catalyst of the invention includes:

a) at least one group VIII metal selected from iridium, nickel, palladium, platinum, rhodium and ruthenium. Platinum and iridium are preferred metals. The percentage by weight is in the range 0.1% to 10%, preferably in the range 0.1% to 5%.

b) at least one additional element M selected from the group formed by germanium, tin, lead, rhenium, gallium, indium and thallium. Tin and germanium are preferred elements. The percentage by weight is in the range 0.01% to 10%, preferably in the range 0.02% to 5%. In some cases, at least two of the metals from this group can advantageously be used at once.

The catalyst can also contain 0.1% to 3% by weight of a halogen or halogen-containing compound. It can also contain 0.01% to 2% by weight of an element such as sulphur.

The catalyst can be prepared using different procedures for impregnating the support and the invention is not limited to any specific impregnation procedure. When several solutions are used, intermediate drying and/or calcining steps can be carried out.

The additional element M can be introduced during production of the support. One method, for example, consists of blending the moist powdered support with catalyst precursors and then forming and drying.

The group VIII metal, additional metal M, optional halogen or halogen-containing compound, and optional metalloid, can be introduced simultaneously or successively, in any order. In accordance with the invention, the characteristic feature of contact with the organometallic element M is that it is introduced in an aqueous solvent.

In a further method, the additional metal M can be introduced during synthesis of the support using a sol-gel type technique. As an example, for a support containing alumina, a mixed metal M—alumina gel can be obtained by hydrolysing an organic solution of Al(OR')$_3$ in a solvent such as ROH or R'OH with an aqueous solution of an organometallic compound of metal M. R and R' represent a methyl, ethyl, isopropyl, n-propyl or butyl type alkyl group or a heavier group such as n-hexyl. The alcoholic solvent must be highly dehydrated before introducing the aluminium alcoholate. After hydrolysis, heat treatment of the gel obtained carried out at a temperature in the range 200° C. to 800° C., preferably in the range 300° C. to 700° C., and more preferably in the range 400° C. to 500° C., ensures complete reaction of the hydrosoluble organometallic compound of metal M with the gel, which involves the formation of the mixed oxide $Al_2O_3$—$MO_x$.

In a still further method, metal M can be added to an alumina sol. U.S. Pat. No. 3,929,683, describes introducing tin in the form of a salt, for example $SnCl_2$ into an alumina sol. In the present invention, it is possible to add a hydrosoluble organometallic compound of metal M to an alumina hydrosol obtained, for example, by precipitating an acid solution of $AlCl_3$ at pH 4–5, then encouraging the compound of metal M to react with the alumina hydrosol, for example using heat or a base.

The precursor of element M can be selected from the group formed by halogen-containing compounds, hydroxides, oxides, carbonates and carboxylates of organometallic compounds of element M. These compounds comprise at least one carbon-M bond. The precursor of element M can also be selected from compounds with general formula $(R_1)_xM(R_2)_y$ where x+y=the valency of metal M and where $R_1$ is selected from the group formed by alkyl, cycloalkyl, aryl, alkylaryl and arylalkyl functions, and $R_2$ is a function with formula $C_aH_bR'_c$, where R' represents a hydroxide, carboxylate, $PO_3H$ or $SO_3H$ function.

In one preparation technique in accordance with the invention, the catalyst is obtained by impregnating the support using an aqueous or organic solution of at least one group VIII metal compound, the volume of the solution preferably being in excess with respect to the retention volume of the support or equal to that volume. The impregnated support is then filtered, optionally washed with distilled water then dried and calcined in air, normally between 110° C. and about 500° C., then reduced in hydrogen at a temperature which is normally in the range about 200° C. to about 600° C., preferably in the range about 300° C. to about 500° C. The product obtained is then impregnated with an aqueous solution of a compound of tin, germanium, lead, rhenium, gallium, indium or thallium. Particularly advantageously, an aqueous solution of a carboxylate compound of tin is used, for example tributyl tin acetate.

The volume of the aqueous solution is preferably equal to the retention volume of the support, more preferably in excess with respect to that volume. The concentration of at least one metal M in the aqueous solution is advantageously in the range 0.01 to 25 mmol/l, preferably in the range 0.5 to 20 mmol/l, and more preferably in the range 0.5 to 15 mmol/l. The pH of the solution is advantageously between 10 and 14, preferably between 10 and 12.

After leaving the support impregnated with the group VIII metal in contact with the solution containing at least one compound of element M for several hours, the product is filtered, optionally washed with water, then dried. The operation is normally completed by calcining between 300° C. and 600° C., preferably in a stream of air for several hours.

In a further technique in accordance with the invention, the catalyst is obtained by impregnating with an aqueous solution of at least one compound of said metal M, the volume of the solution preferably being equal to the retention volume of the support, more preferably in excess with respect to that volume. Particularly advantageously, an aqueous solution of a tin carboxylate compound is used. The concentration of at least one metal M in the aqueous solution is advantageously in the range 0.01 to 25 mmol/l, preferably in the range 0.5 to 20 mmol/l, more preferably in the range 0.5 to 15 mmol/l. The pH of the solution is advantageously in the range 10 to 14, more preferably in the range 10 to 12. After leaving the solid and impregnating solution in contact for several hours, the product is dried. The operation is normally completed by calcining between 300° C. and 600° C., preferably in a stream of air for several hours. The solid obtained is then impregnated using an aqueous or organic solution of at least one group VIII metal, the volume of the solution preferably being in excess with respect to the retention volume of the support or equal to that volume. After several hours of contact, the product obtained is dried and calcined in air between 300° C. and 600° C., preferably in a stream of air for several hours.

Before use, the catalyst is reduced in hydrogen, for example between 20° C. and 600° C., to obtain an active metal phase. This treatment consists, for example, in slowly raising the temperature in a stream of hydrogen to the maximum reduction temperature, in the range 20° C. to 600° C., for example, preferably in the range 90° C. to 500° C., followed by maintaining that temperature for a period of 1 to 6 hours, for example.

This reduction can be carried out immediately after calcining or later at the user's location. It is also possible to directly reduce the dried product at the user's location.

It is also possible to carry out prior reduction of the group VIII metal compound in solution using organic molecules with a reducing nature such as formic acid. The compound of additional element M can be introduced simultaneously or successively. One possibility consists of filtering then drying the catalyst obtained. It can then be calcined followed by reduction using the conditions described above. It is also possible to carry out direct reduction of the dried product.

In accordance with the invention, the catalyst described above is used in processes for reforming gasolines and for producing aromatics. Reforming processes can increase the octane number of gasoline fractions originating from distilling crude oil and/or from other refining processes. Processes for producing aromatics provide bases (benzene, toluene and xylenes) for use in the petrochemicals industry. These processes have a supplementary importance as they contribute to the production of large quantities of hydrogen which is indispensable for hydrogenation and hydrotreatment processes carried out in the refinery. These two processes are distinguished by the choice of operating conditions and the composition of the feed.

The typical feed treated by these processes contains paraffinic, naphthenic and aromatic hydrocarbons containing 5 to 12 carbon atoms per molecule. This feed is defined, inter alia, by its density and its composition by weight. This feed is brought into contact with the catalyst of the present invention at a temperature in the range 400° C. to 700° C. The mass flow rate of the treated feed per unit mass of catalyst can vary from 0.1 to 10 kg/kg/h. The operating pressure can be fixed at between atmospheric pressure and 4 MPa. A portion of the hydrogen produced is recycled in a molar recycle ratio in the range 0.1 to 10. This ratio is the molar ratio of the hydrogen recycle rate to the feed flow rate.

The following examples illustrate the invention without in any way limiting its scope.

EXAMPLE 1

Two catalysts A and B were prepared, comprising 0.25% by weight of platinum, 0.14% by weight of tin and 1.2% by weight of chlorine. The support was a γ alumina with a specific surface area of 210 $m^2$ per gram.

Catalyst A (comparative)

Catalyst A was prepared using prior art techniques. 140 $cm^3$ of an aqueous solution of hydrochloric acid and stannic chloride containing 0.014 g of tin was added to 10 g of alumina support. It was left in contact for 3 hours then drained. The solid was then brought into contact with 140 cm$^3$ of an aqueous hexachloroplatinic acid solution containing 0.025 g of platinum. After 3 hours contact, the solid was dried for 1 hour at 120° C. and calcined for 2 hours at 500° C.

Catalyst B (in accordance with the invention)

10 g of alumina support was brought into contact with 140 cm$^3$ of an aqueous ammoniacal solution (pH 11) containing 0.014 g of tin in the form of tributyltin acetate (Bu$_3$SnOC (O)CH$_3$). After 3 hours of reaction at room temperature, the solid was filtered then dried for 1 hour at 120° C. and calcined at 500° C. for 2 hours. 10 g of that solid was brought into contact with 140 cm$^3$ of an aqueous hydrochloric acid solution and hexachloroplatinic acid containing 0.025 g of platinum. It was left in contact for 3 hours, dried for 1 hour at 120° C. then calcined for 2 hours at 500° C.

EXAMPLE 2

A catalytic reforming test was carried out on catalysts A and B in an isothermal tube reactor. 10 g of catalyst was reduced at 510° C. for 2 hours in a stream of 20 liters per hour of hydrogen. The operating conditions were as follows:

feed: n-heptane temperature: 480° C. or 510° C.

pressure: 0.8 MPa

H$_2$/nC$_7$ (molar): 4 mass flow rate of liquid nC$_7$/mass of catalyst: 3 h$^{-1}$

The results obtained under these conditions are shown in Table 1. The yields are expressed as % by weight with respect to the feed.

TABLE 1

| Catalysts | Temperature (°C.) | Yields (% by weight) | | |
|---|---|---|---|---|
| | | aromatics | H$_2$ | C$_1$–C$_4$ |
| A | 480 | 25.4 | 0.92 | 34.5 |
| | 510 | 39.9 | 1.62 | 36.6 |
| B | 480 | 28.2 | 0.99 | 27.0 |
| | 510 | 43.7 | 1.95 | 33.0 |

The performance of catalyst B, prepared in accordance with the invention in an aqueous medium from an organometallic precursor, was better than that of catalyst A prepared using prior art techniques.

What is claimed is:

1. A process for catalytic reforming and for producing aromatics comprising reacting a hydrocarbon feed under reforming conversion conditions in contact with a catalyst comprising at least one support, at least one metal from group VIII of the periodic table and at least one additional element M selected from the group consisting of germanium, tin, lead, rhenium, gallium, indium and thallium, said catalyst containing optional sulfur and optional halogen or halogen-containing compound said process being characterized in that the catalyst is prepared using a process in which said additional element M is introduced in an aqueous solvent in the form of at least one water-soluble organometallic compound containing at least one carbon-M bond.

2. A process according to claim 1, characterized in that the feed is constituted by paraffinic, naphthenic and aromatic hydrocarbons containing 5 to 12 carbon atoms per molecule.

3. A process according to claim 1, in which the catalyst further contains sulfur.

4. A process according to claim 1, in which the catalyst further contains at least one halogen or halogen-containing compound.

5. A process according to claim 1 in which in the catalyst, the group VIII metal is iridium, nickel, palladium, platinum, rhodium or ruthenium.

6. A process according to claim 5, wherein said group VIII metal is platinum or iridium.

7. A process according to claim 1 in which in the catalyst, element M is germanium or tin.

8. A process according to claim 7, wherein said group VIII metal is platinum or iridium.

9. A process according to claim 8, wherein the organometallic compound of element M is tributyl tin acetate.

10. A process according to claim 1 in which in the catalyst, a precursor of element M is selected from the group consisting of hydroxides, halogen-containing compounds, and carboxylates of organic compounds of element M.

11. A process according to claim 10 in which in the catalyst, the precursor of element M is a carboxylate of an organic compound of element M.

12. A process according to claim 11 in which in the catalyst, the precursor of element M is tributyltin acetate.

13. A process according to claim 1, in which in the catalyst, the group VIII metal, additional element M, optional halogen and optional sulfur are introduced into the support successively or simultaneously.

14. A process according to claim 1, in which the catalyst is prepared by carrying out the following steps:

impregnating a support using an aqueous or organic solution of at least one group VIII metal, filtering, drying and calcining;

impregnating the product obtained using an aqueous solution of at least one compound of element M, filtering, drying, optionally reducing, then calcining.

15. A process according to claim 1, in which during preparation of the catalyst, the support is impregnated with an aqueous solution of at least one metal M, the volume of the solution being at least equal to the retention volume of the support.

16. A process according to claim 1, in which during preparation of the catalyst, the concentration of at least one metal M in the resultant aqueous solution is in the range of 0.01 to 25 mmol/l.

17. A process according to claim 16, in which the concentration of at least one metal M in the resultant aqueous solution is in the range of 0.5 to 20 mmol/l.

18. A process according to claim 16, wherein the concentration in the resultant aqueous solution is in the range of 0.5 to 15 mmol/l.

19. A process according to claim 1, in which during preparation of the catalyst, the pH of the resultant aqueous solution of at least one compound of metal M is selected so as to be between 10 and 14.

20. The process of claim 19 wherein the pH of the resultant aqueous solution of at least one compound of metal M is between 10 and 12.

21. A process according to claim 1, in which during preparation of the catalyst, at least one additional element M is introduced during production of the support.

22. A process according to claim 21, in which during preparation of the catalyst, the additional element M is introduced during synthesis of the support using a sol-gel technique.

23. A process according to claim 22, in which during preparation of the catalyst, an aqueous solution of an organometallic compound of metal M is used to hydrolyse an organic solution of an alkoxy compound of a metal of the support in an alcoholic solvent.

24. A process according to claim 1, in which the catalyst is reduced in hydrogen at a temperature in the range 20° C. to 600° C.

25. A process according to claim 1, in which the feed to be treated is brought into contact with the catalyst at a temperature in the range 400° C. to 700° C., with a mass flow rate of treated feed per unit mass of catalyst in the range 0.1 to 10 kg/kg/hour, at a pressure in the range from atmospheric pressure to 4 MPa.

26. A process according to claim 1, in which the reforming reaction is conducted in the presence of hydrogen and results in the production of hydrogen, and at least a portion of the hydrogen produced is recycled to the reforming reaction in a molar recycle ratio in the range 0.1 to 10.

* * * * *